Figure 1:
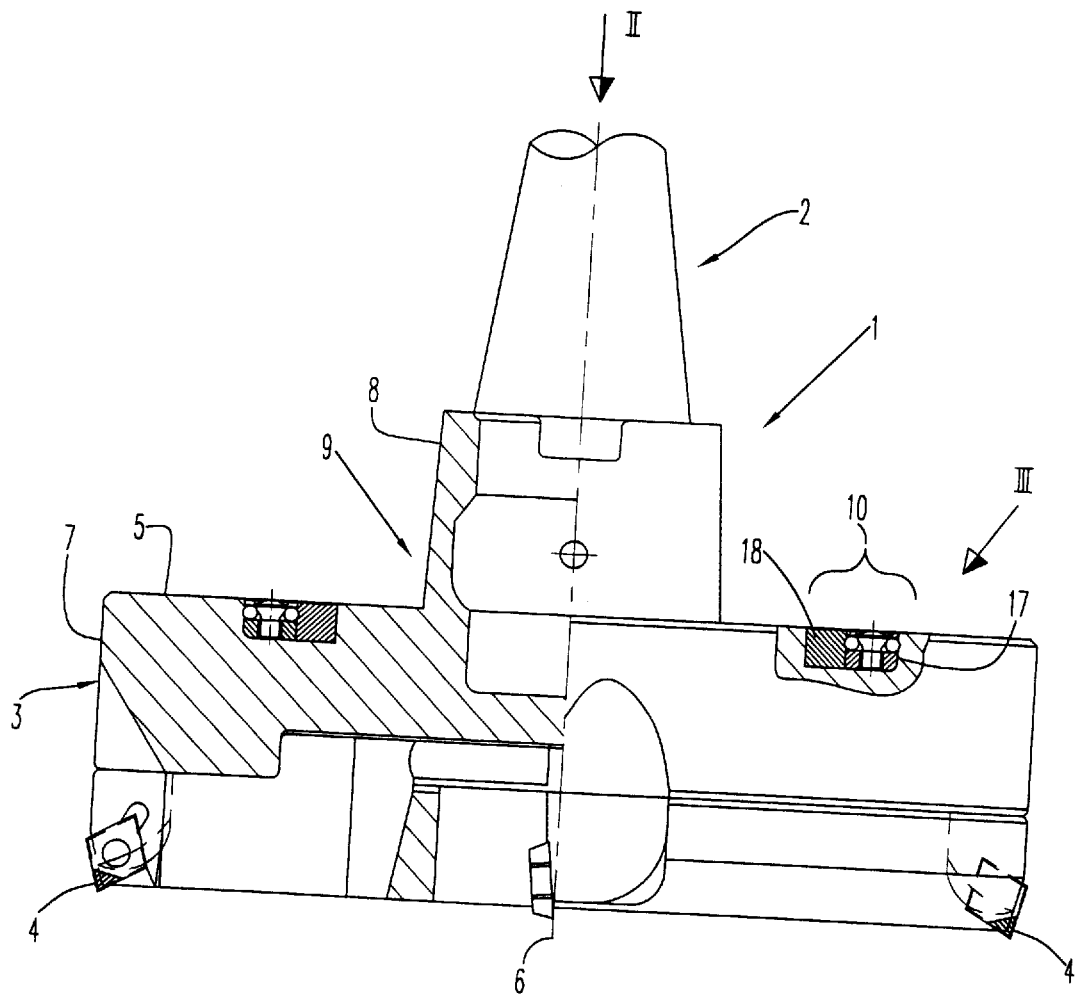

United States Patent
Jager et al.

[11] Patent Number: 5,810,527
[45] Date of Patent: Sep. 22, 1998

[54] ROTARY TOOL WITH BALANCING RINGS

[75] Inventors: Horst Jager, Nurnberg; Gebhard Muller, Furth, both of Germany

[73] Assignee: Kennametal Hertal AG, Furth, Germany

[21] Appl. No.: 716,170
[22] PCT Filed: Feb. 17, 1995
[86] PCT No.: PCT/EP95/00576
 § 371 Date: Sep. 18, 1996
 § 102(e) Date: Sep. 18, 1996
[87] PCT Pub. No.: WO95/26258
 PCT Pub. Date: Oct. 5, 1995

[30]      Foreign Application Priority Data
Mar. 29, 1994 [DE] Germany ............................ 9405559 U

[51] Int. Cl.⁶ .................................................... B23C 9/00
[52] U.S. Cl. ...................... 409/141; 74/573 R; 82/903; 408/143; 451/343
[58] Field of Search ................................ 409/131, 141, 409/232, 234; 408/143; 74/573 R; 82/903; 451/343

[56]          References Cited
         U.S. PATENT DOCUMENTS

| 1,211,488 | 1/1917 | Reed ........................................ 451/343 |
| 2,641,877 | 6/1953 | Anderson ................................ 451/343 |
| 2,861,471 | 11/1958 | Kronenberg ............................. 82/903 |
| 3,528,316 | 9/1970 | Hammer ................................. 74/573 R |
| 5,033,923 | 7/1991 | Osawa ..................................... 409/131 |
| 5,074,723 | 12/1991 | Massa et al. ............................. 409/131 |
| 5,125,188 | 6/1992 | Ogawa et al. ........................... 451/343 |
| 5,478,177 | 12/1995 | Romi ....................................... 408/143 |
| 5,555,144 | 9/1996 | Wood et al. ........................ 360/98.08 |

*Primary Examiner*—A. L. Pitts
*Assistant Examiner*—Christopher Kirkman
*Attorney, Agent, or Firm*—John J. Prizzi; John M. Vasuta

[57]          ABSTRACT

A rotary tool, in particular a high-speed milling or boring tool, has at least two balancing rings (17, 18) with a variable mass around their circumference mounted on the tool holder or tool body (1). Two concentric balancing rings (17, 18) whose position in relation to the axis of rotation (6) of the tool (1) may be adjusted are releasable mounted in the tool holder or in the tool body (1) and are supported in the radial direction (14) in the tool holder or tool body (1). A short rotary tool (1) is thus obtained with a simple support of the balancing rings (17, 18) in the radial direction.

19 Claims, 3 Drawing Sheets

ROTARY TOOL WITH BALANCING RINGS

The present invention relates to a rotary tool, in particular a high-speed milling or boring tool, in accordance with the preamble to the main claim.

Rotary tools with balancing rings of this type are disclosed, for example, in U.S. Pat. No. 5,263,995 or in U.S. Pat. No. 5,074,723. The disadvantage of such rotary tools comprising tools as well as tool holders, which operate at very high speeds, for example in the order of up to 20,000 revolutions per minute, is the problem of fine balancing of the tools and the tool holders. In accordance with the prior art, e.g. as represented through the two aforementioned U.S. patents, two balancing rings are disposed to this end on the circumference of the tool or the tool holder at an axial distance from each other. These balancing rings for the purpose of fine balancing are slidable with their inner circumference on the outer circumference of the rotary tool or the rotary tool holder in the circumferential direction and can be fixed in different rotating positions relative to the tool body or the tool holder body. In particular, this relative slidability of the balancing rings in relation to the tool body or the tool holder body is continuously variable.

The balancing rings for fine balancing are provided with a variable mass around their circumference. This is most easily attained by boring through the balancing rings in certain circumferential areas. For example, these could be bore holes running parallel to the axis of rotation of the tool or the tool holder, whereby a reduction in mass can be attained in the affected circumferential area of the balancing ring in question.

The balancing of kinetic energy, i.e. the fine balancing, is then achieved through the fact that at least one of the balancing rings, preferably however both rings are moved to a rotating position in relation to the tool or the tool holder and are fixed in this position at which the balancing of kinetic energy is at its desired fineness.

The constructive design of the carrier body—whether this is the tool body or the tool holder body—in accordance with the prior art has the disadvantage that, during operation, the balancing rings are subject to considerable centrifugal forces as a result of the high speeds and are thereby weakened in their cross-section and could burst in the area of the bore holes in the balancing rings as well as in the area of the clamping elements designed for fixing the balancing rings. A further disadvantage of the known embodiments is the fact that the balancing rings lying adjacent to each other in the axial direction of the tool or the tool holder require a certain face-to-face length, which leads to an increase in the overall length of the tool body or the tool holder body in the axial direction.

The object of the present invention is therefore to further develop a rotary tool, in particular a high-speed cutting or boring tool, of the type mentioned at the beginning to such an extent that a shorter overall length of the entire system formed by the tool holder as well as the tool itself can be attained through a space-saving arrangement of the balancing rings. Furthermore, the present invention aims to support the balancing rings at least partially on their outer circumference such as to reduce to a large extent, if not, completely rule out the risk of damaging the balancing rings and thereby also the tool through the high centrifugal forces occurring while the tool is in operation.

This object is attained through the rotary tool in accordance with the invention which is embodied according to the characteristic features of the main claim. The fact that two balancing rings are concentric to each other and thereby are normally disposed on a common level to the axis of rotation of the tool or the tool holder results in a short overall design of the entire system formed by the tool and the tool holder. Since the balancing rings are disposed within each other, they can support each other in a radial direction. The invention also provides for the balancing rings themselves to be supported in a radial direction through the tool holder body or the tool body, so that the high centrifugal forces occurring during operation that are exerted on the balancing rings are fed via the outer circumference of the balancing rings into the material of the tool holder or the tool body and absorbed there. This radial support of the balancing rings thereby eliminates or at least reduces to the maximum extent the risk of the balancing rings breaking in areas with reduced thickness or in those areas having bore holes to decrease the mass of the balancing rings and/or to fix said rings along the circumference.

To attain a particularly simple and secure arrangement of the balancing rings in a desired position, the rotary tool in accordance with the invention is further developed as is secured in claim 2. Such concentric, circular grooves can easily be embodied in corresponding end areas or flange-like sections of the tool body or of the tool holder with the corresponding fitting for the insertion of at least one balancing ring. The embodiment of circular grooves, concentric to the axis of rotation, for the insertion of the balancing rings results in the balancing rings being supported around their entire outer circumference and thereby the centrifugal forces being correspondingly absorbed in the material of the tool holder or the tool body. If the area of the end face or the flange-like area for insertion of the balancing rings is made sufficiently large, a corresponding circular groove can be made for each of the balancing rings to be used (at least two), with one balancing ring being disposed within each such groove. However, in case of tight space conditions and so as to easily fix the desired position of the balancing rings, a single circular groove for insertion of both balancing rings can be sufficient in accordance with the invention. In accordance with a particularly preferred embodiment, the circular groove for insertion of the balancing rings is dimensioned as indicated in claim 3.

As already indicated, care must be taken to correctly fix the balancing rings in relation to the tool holder or to the tool body. With a number of insertion apertures corresponding to the balancing rings being provided, specifically grooves for the balancing rings, each balancing ring must be designed with a suitable fixing or clamping device. In the case that two balancing rings are inserted into the same groove in the tool holder or in the tool body, the balancing rings can be disposed such that only one of the two balancing rings need be designed with such a fixing or clamping device.

To fix the balancing rings in a particularly simple and effective manner, the design is made in accordance with a preferred embodiment of the invention as secured in claim 5. Such clamping elements which are adjustable in the radial direction result in a splitting of the associated balancing ring in the circular groove in the set rotating position against the body of the tool holder or of the tool itself, wherein the clamping elements can be radially adjusted through a correspondingly adjustable clamping member. In accordance with a particularly preferred embodiment, the clamping device is designed as shown in claim 6. Such splitting spheres can be inserted into simple bore holes of the corresponding balancing ring, wherein the clamping element formed by the splitting sphere slides radially in a corresponding manner in the direction normally on the level of the balancing ring as a result of screwing in a screw with a slope, for example a countersunk flat screw. This results, first, in the balancing ring designed with the clamping element being fixed to a side wall of the groove for insertion of the balancing ring, and secondly, in the other clamping element taking effect against the outer circumference of the adjacent balancing ring. In the same way, the other balancing ring which does not have its own clamping device is fixed at the same time against the tool holder or the tool body.

The preferred embodiment for even spreading of the forces for fixing the balancing ring is secured in claim 7.

Scales are designed, as indicated in claim 8, in order to provide for a suitably easy repeatability of the relative positioning of the balancing rings in relation to each other and in relation to the tool holder or to the tool body.

A particularly space-saving embodiment of a rotary tool in accordance with the invention while keeping the overall length as short as possible is produced by using a milling cutter, as described in more detail in claim 9. Since the milling cutter body must also have a sufficient axial extension in each case for insertion and fixing of the cutting edges and thereby has a corresponding material cross-section, at least one groove for insertion of the balancing rings can be easily designed in accordance with the invention on the end face opposite the cutting disks, such that the tool is not any longer in accordance with the invention than a corresponding tool designed without balancing rings.

Figure 2:
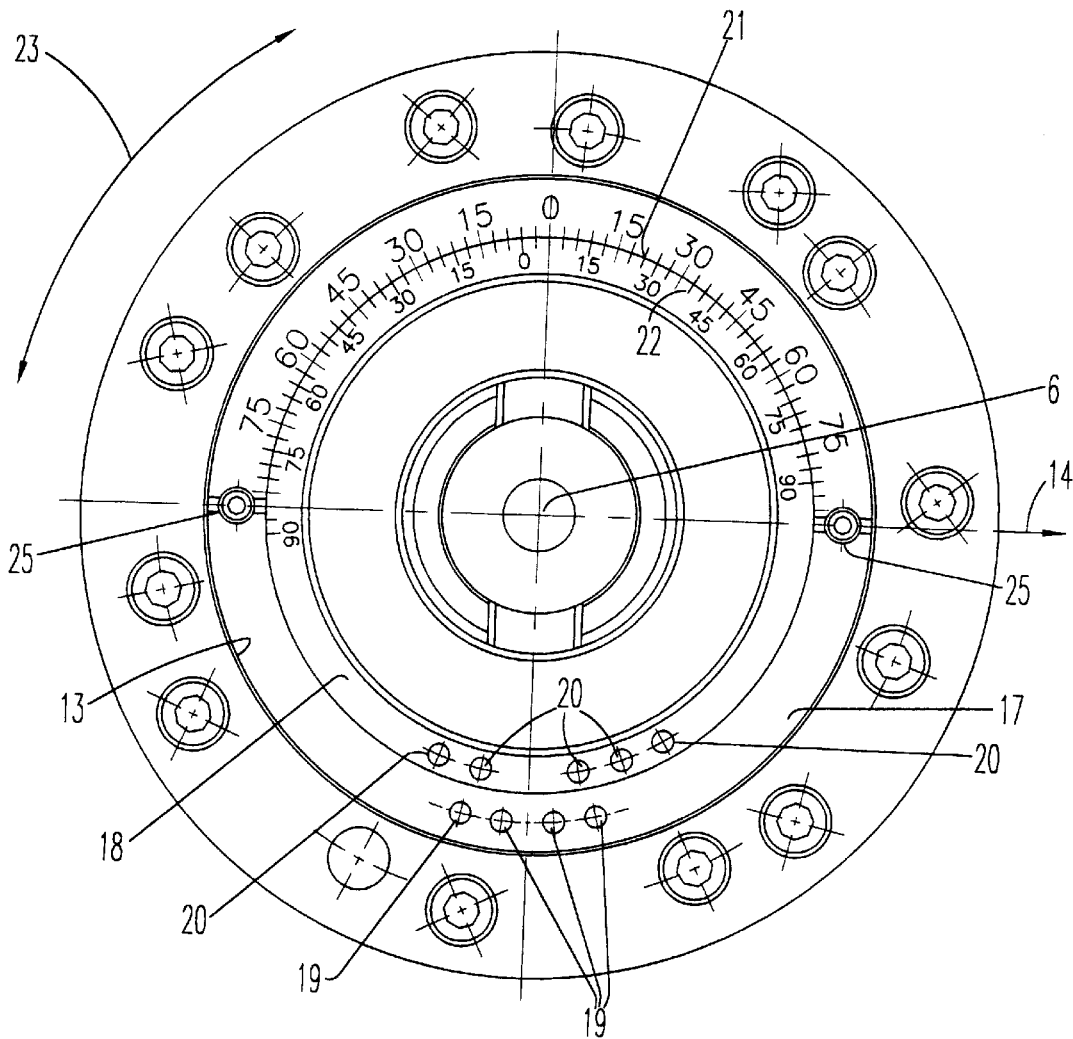
Figure 3:
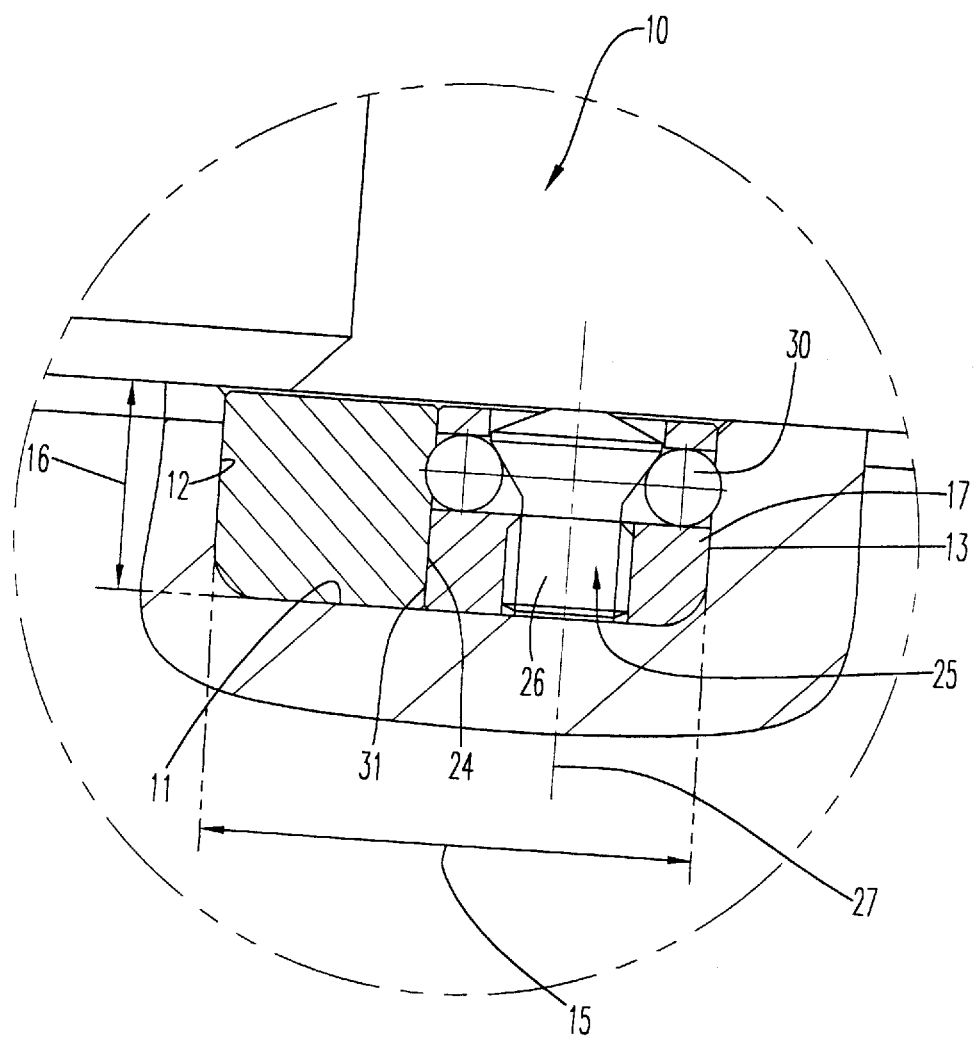

The invention is described below in more detail using the exemplary embodiment shown in the accompanying drawing, in which the rotary tool in accordance with the invention is formed by a milling cutter. This shows:

FIG. 1 a side view—partially in cross-section—of a rotary tool in accordance with the invention with inserted balancing rings, FIG. 2 a top view of the rear side of the rotary tool from FIG. 1 in the direction of arrow II, and FIG. 3 a magnified sectional view of area III from FIG. 1.

The milling cutter body referenced in its entirety as 1, which represents the rotary tool, has a steep taper 2 on its rear side for fixing a machine tool to the spindle and a flange-like cutter supporter 3 on its front side. The exemplary embodiment shown is a surface milling cutter having cutting bodies 4 disposed on the front end face of flange-like cutter supporter 3.

As can be seen from FIG. 1, an end face 5 of cutting supporter 3, said end face being opposite to cutting bodies 4, is disposed on a level that is at right angles to axis of rotation 6 of the milling cutter. It is important that there is a step-like intermediate area between an outer circumference 7 of flange-like cutter supporter 3 and a shaft circumference 8 of a milling cutter area adjoining backward-facing end face 5 on the rear side. A ring groove 10 being open to the rear side, i.e. to the side opposite cutters 4, and being concentric to axis of rotation 6 in end face 5 is embodied in this stepped area 9.

The cross-sectional form of said ring groove 10 is particularly clear from FIG. 3. This has a groove base 11, an inner side wall 12 and an outer side wall 13. Ring groove 10 basically has a rectangular cross-section, wherein the effective width 15 of ring groove 10 in a radial direction 14 of rotary tool 1 is approximately twice the size of a groove depth 16.

Within ring groove 10, an outer balancing ring 17 and an inner balancing ring 18 are disposed concentric to each other, i.e. to axis of rotation 6. Both balancing rings 17, 18 are designed in a circumferential area—shown at the top of FIG. 2—with bore holes 19 or 20 reducing their mass. Bore holes 19, 20 are positioned in an arc of a circle concentric to axis of rotation 6 at equal distances from each other, and their boring axes basically run parallel to axis of rotation 6 of rotary tool 1.

The two balancing rings 17, 18 bear a scaling division 21 or 22 in the border area to each other on their outside surface facing the rear side of rotary tool 1. Both scaling divisions 21, 22 correspond to each other and thereby provide for a particularly precise positioning while also allowing each rotating position to be repeated and documented. If necessary, end faces 5 can also have a scaling in the area of groove 10.

The two balancing rings 17, 18 are sealed in an interlocking or sliding manner to side walls 12, 13 of ring groove 10. In the embodiment shown, balancing rings 17 and 18 can be fixed with just one fixing or clamping device on one balancing ring, because balancing rings 17 and 18 are disposed beside each other in the same recess or ring groove 10. The fixing device connected to the outer balancing ring comprises a countersunk flat screw 25 that can be screwed into the outer balancing ring 17 with its shank 26. The screw axis 27 runs parallel to axis of rotation 6 of the body. While being screwed in, a countersunk head 28 of screw 25 with its cone-envelope-shaped circumferential surface spreads apart the clamping elements formed by splitting spheres 29, 30 in radial direction 14 of rotary tool 1. The inner splitting sphere 29 is hereby pressed against inner balancing ring 18, and outer splitting sphere 30 is pressed against outer side wall 13 of the groove. This pressing effect not only securely fixes outer balancing ring 17 at the circumference, but also securely fixes inner balancing ring 18 within ring groove 10, or against rotary body 1.

The two balancing rings 17, 18 can be adjusted in circumferential direction 23 by simply releasing fixing screw 25. As can be seen in FIG. 2, two fixing screws or fixing devices 25 are disposed in areas of outer balancing ring 17 that are diametrically opposite each other in order to ensure a simple and symmetrical fixing of balancing rings 17 and 18.

By means of the shown embodiment with only one ring groove 10 and two balancing rings 17, 18 being disposed therein and concentric to each other, as already mentioned above, only one of the two balancing rings 17 is given a clamping or fixing device, while, in the case of separately disposed balancing rings, both balancing rings disposed adjacent to each other require such a fixing device.

In accordance with the embodiment shown, outer balancing ring 17, which is provided with the fixing device that weakens the ring cross-section, is directly supported around its entire circumference on outer side wall 13 of ring groove 10 in a particularly effective manner against the centrifugal forces exerted on it. Inner balancing ring 18 is also given such an effective support in the radial direction through its arrangement on an inner ring wall 31 of outer balancing ring 17.

Instead of the direct arrangement of at least one ring groove 10 for insertion of balancing rings 17 and 18 in the body of tool 1 itself, an alternative embodiment—for example in connection with a high-speed drill, in which case it is of course not possible to fix balancing rings on the tool formed by the drill—can have the tool holder itself in a stepped, flat area with at least one groove 10 for insertion of concentric balancing rings 17 and 18 within each other.

We claim:

1. A rotary tool, in particular a high-speed milling or boring tool, having at least two balancing rings with a variable mass around their circumference mounted on the tool, the rotary tool having an axis of rotation, characterized by the fact that two concentric balancing rings, whose position in relation to each other and in relation to the axis of rotation of the tool may be adjusted, are releasably mounted in the tool and are supported radially adjacent one another.

2. The rotary tool in accordance with claim 1, characterized by the fact that the tool (1) includes an end face substantially perpendicular to the axis of rotation of the tool, the end face having at least one circular groove being concentric to the axis of rotation of the tool for insertion of the two balancing rings.

3. The rotary tool in accordance with claim 2, characterized by the fact that the width of the groove holding the balancing rings in the radial direction of the tool is approximately twice the depth of the groove.

4. The rotary tool in accordance with claim 2 characterized by the fact that the tool is formed as a milling cutter and that a groove for insertion of the balancing rings, is on that end face of the milling cutter body that faces away from any cutting inserts.

5. The rotary tool in accordance with claim 1, characterized by the fact that at least one balancing ring includes at least one clamping device.

6. The rotary tool in accordance with claim 5, characterized by the fact that two clamping devices are on the at least one balancing ring and are diametrically opposite each other in relation to the axis of rotation of the tool.

7. The rotary tool in accordance with claim 1, characterized by the fact that the balancing rings have a scale on at least one outward facing end face.

8. The rotary tool in accordance with claim 1, characterized by the fact that a clamping force is provided to the balancing rings by a clamping member through clamping elements which are adjustable in the radial direction with respect to the tool axis as the clamping member is adjusted within at least one of the balancing rings.

9. The rotary tool in accordance with claim 8, characterized by the fact that the clamping elements are formed of splitting spheres and that the clamping member is formed of a screw having a tapered surface.

10. A rotary tool having an axis of rotation and comprising:

at least two balancing rings with a variable mass around their circumference, each of the balancing rings being adjustably positioned in relation to each other and in relation to the axis of rotation, and each of the balancing rings being releasably mounted radially adjacent each other in the tool; and at least one of the balancing rings has a clamping force provided thereto by a clamping member through radially adjustable clamping elements as the clamping member is adjustably positioned in the respective balancing ring.

11. The rotary tool of claim 10 wherein the clamping elements are formed of splitting spheres and that the clamping member is formed of a screw having a tapered surface thereon.

12. The rotary tool of claim 10 wherein the at least one balancing ring includes two clamping members with radially adjustable clamping elements, where the clamping members are diametrically opposed to each other in relation to the axis of rotation.

13. A rotary tool having an axis of rotation and comprising:

a tool body for receiving a machine tool, the tool body including an annular groove therein that is substantially radial to the axis of rotation, and the groove including an innermost surface, an outermost surface and a base surface;

an innermost balancing ring adjustably positioned along the innermost surface and in relation to the axis of rotation; and an outermost balancing ring adjustably positioned along the outermost surface and in relation to the innermost balancing ring and in relation to the axis rotation, whereby the balancing rings are radially adjacent one another along the axis of rotation.

14. The rotary tool of claim 13 wherein the balancing rings are radially stacked on each other.

15. The rotary tool of claim 13 wherein the tool body includes an end face substantially perpendicular to the axis of rotation and including the annular groove therein.

16. The rotary tool of claim 13 wherein at least one of the balancing rings has a clamping force provided thereto by a clamping member through radially adjustable clamping elements as the a clamping member is adjustably positioned in the respective balancing ring.

17. The rotary tool of claim 16 wherein the clamping elements are formed of splitting spheres.

18. The rotary tool of claim 17 wherein the clamping member is formed of a screw having a tapered surface thereon.

19. The rotary tool of claim 18 wherein the at least one balancing ring includes two clamping devices that are diametrically opposed to each other in relation to the axis of rotation.

* * * * *